United States Patent [19]

Hughes

[11] 3,891,602

[45] June 24, 1975

[54] EPOXY SCALE-RESISTANT COATING

[75] Inventor: James W. Hughes, Houston, Tex.

[73] Assignee: Texaco Inc., New York, N.Y.

[22] Filed: Sept. 24, 1973

[21] Appl. No.: 399,906

Related U.S. Application Data

[62] Division of Ser. No. 212,631, Dec. 27, 1971, Pat. No. 3,799,797.

[52] U.S. Cl.............. 260/47 EN; 117/72; 117/75; 117/123 D; 117/124 E; 117/132 BE; 117/138.8 A; 117/161 KP; 117/161 ZB; 252/180; 260/47 EP; 260/77.5 AM; 260/77.5 TB; 260/830 P
[51] Int. Cl............................................ C08g 30/14
[58] Field of Search .. 260/77.5 AM, 77.5 R, 47 EC, 260/47 EN, 47 EP, 2 EP, 830 P, 858; 117/72, 117/161 ZB

[56] References Cited

UNITED STATES PATENTS 3,321,549  5/1967  Barth .................................. 260/830
3,660,523  5/1972  Grawe et al. ..................... 260/47 X

FOREIGN PATENTS OR APPLICATIONS 1,050,257  12/1966  United Kingdom ........ 260/77.5 MA Primary Examiner—Morris Liebman
Assistant Examiner—T. Pertilla
Attorney, Agent, or Firm—T. H. Whaley; C. G. Ries; Kenneth R. Priem

[57] ABSTRACT

Novel epoxy resins modified with polyisocyanates and pendant polyether chains provide an excellent scale-resistant surface when applied as a coating and exposed to mineralized water prone to deposit scale on surfaces.

4 Claims, No Drawings

EPOXY SCALE-RESISTANT COATING

This is a division of application Ser. No. 212,631, filed Dec. 27, 1971, now U.S. Pat. No. 3,799,797.

This invention concerns methods of inhibiting and/or controlling mineral-scale formation upon surfaces which are normally suceptible to scale formation during contact with mineralized waters.

More particularly, this invention concerns the production of scale-resistant coatings and articles through the use of novel resins of the epoxy type characterized by having as integral parts of their molecular structure polyisocyanate crosslinking members and "pendant" polyether chains; pendant polyether chains being defined herein as polyether chains which are attached by primary chemical bonds at one end only to the polymeric skeletal network Mineralized or "hard" waters as defined throughout this application are waters containing in solution alkaline earth and/or iron compounds which upon alteration of environmental conditions are prone to deposit mineral scale therefrom on surfaces contacting them.

BACKGROUND OF THE INVENTION

Inorganic mineral scale concretion or the deposition of scale coatings derived from the extended contact of surfaces normallly susceptible to scale formation with hard waters, particularly waters containing alkaline earth and/or iron compounds, is both wasteful and commonplace. While scale formation upon metal surfaces presents the more serious probllem, non-metallic surfaces including ceramics, glasses and organic polymers may also undergo scaling.

Particularly troublesome are the tenacious "furs" or "crusts" that form in operational processing equipment in continuous and/or prolonged contact with aqueous solutions of inorganic salts as, for example, alkaline earth sulfates, carbonates and bicarbonates. This type of scale formation creates serious problems for the petroleum and gas-producing industries, where the build-up of undesirable inorganic mineral scale deposits can take place in equipment or tubing of difficult or limited accessibility. These include flow lines in both surface and subterranean locations, including auxiliary producing equipment, such as heaters, pumps, valves, rods, and the like. In addition, scale formation can also cause substantial problems in the chemical processing industries, public utilities, and in other situations where mineral-laden water is processed or used, as in heat exchangers, storage vessels, piping, reactors, evaporators, and the like.

Several different explanations have been advanced as to how the formation of mineral scale deposits, such as for example calcium or barium sulfate, takes place. One machanism leading to scale formation comes about from the mingling of a fluid stream containing a substantial concentration of an anion or cation with another stream containing antagonistic counter ions. An illustration of this mechanism would be a case in which one process stream containing a soluble calcium compound contacts another stream containing a soluble sulfate compound to cause precipitation of calcium sulfate. Should the mixing of such imconipatible waters take place in a well bore, the result may be deposition of a crust of calcium sulfate which, if allowed, can build up on the surface of submerged equipment such as tubing, and may even choke off fluid flow by diminution of utilizable diameter unless corrective descaling measures are undertaken. In the case of heat exchange equipment, the mineral scale deposition insulates the equipment from the source or sink of heat and increases the cost of operation and may cause extensive maintenance or down-time and increased operational costs.

Another cause of mineral scale formation arises from aqueous solutions of inorganic materials having an inverse solubility curve, that is, a solubility which decreases as the temperature increases. An excellent example of this is calcium sulfate, whose solubility in water decreases with increased temperature. In these instances the solution immediately adjacent to the heating surface reaches saturation the most quickly, dropping calcium sulfate at this junction which is held tenaciously to the heating surface.

Yet another cause of scale formation is attributable to precipitation of scale material from supersaturated solutions, of which the preceding example is a special case. When temperature and/or pressure changes occur, or the concentration of some solubility substances is substantially decreased, this change of conditions can result in scale formation on the tubing or other equipment being operated.

Whatever the reason or reasons for scale formation may be, as oulined above, it is a troublesome and expensive process that can lead to costly, unscheduled maintenance and even to the breakdown of operational units. For these reasons, a number of remedial measures have been resorted to, both for the removal of scale and mitigation of its formation.

Scale is ordinarily removed by either chemical or mechanical methods, or a combination of both methods. In chemical descaling procedures, the problem is to find a material that will dissolve or loosen the mineral scale without attacking the underlying substrate.

Inhibited hydrochloric acid has proved useful in instances where the scale is acid soluble, as is the case with calcium carbonate scale. Unfortunately, however, many mineral scales, such as those of calcium and barium sulfate, are not appreciably soluble in acids. Calcium sulfate scale can sometimes be dissolved or loosened by treatment with ammonium salts, polyphosphates, or hydroxides, often followed by acid washings.

Mechanical descaling procedures are often resorted to employing such devices as scrapers, brushes, high-pressure abrasive jets, and the like, but these methods are tedious, expensive and of restricted applicability.

In view of the numerous inherent in removal by whatever means of mineral scale once formed, the use of scale-preventive methods has been widely practiced for many years. The addition of chemical "scale inhibitors " such as phosphates, both organic and inorganic, tannin materials, chelating agents, natural and synthetic polymers, and the like to scale-prone systems is therefore old in the art. However, the use of such scale inhibitors also suffers serious shortcomings, the most notable being (1) the necessity of maintaining them at constant critical levels of concentration in the systems being protected, (2) the absence of chemical scale inhibitors which provide protection under a diversity of scaling conditions, (3) their general thermal lability and (4) their tendency after prolonged usage to themselves induce the formation of insoluble deposits.

As a consequence of the many problems, as outlined in brief above, which are encountered in methods of removing scale already deposited, as well as in the methods of scale prevention as currently practiced, a novel and efficient means is taught by the instant invention whereby the deposition and/or adherence of mineral scale from hard waters upon surfaces may be mitigated or prevented by virtue of a novel protective coating which is at once long lived, environmetally stable, required little maintenance, and is broad in applicability.

Various types of protective "plastic" coatings including those based on polyurethane resin and epoxy resin formulations are commonly applied to metal surfaces subject to service in contact wtih corrosive aqueous environments to prevent corrosive attack; however, both laboratory and in-service performance tests have given evidence that these coatings, while affording effective protection against corrosive attack on the metal, are not substantially less prone to scale build-up in the frequently encountered situation where the corrosive environment is also conductive to scale deposition.

Copending application Ser. No. 141,892 filed May 10, 1971 discloses a two component polyurethane type coating having pendant polyether chains which are scaleresistant. Copending application Ser. No. 142,014 filed May 10, 1971 discloses phenolic type coatings having pendant polyether chains which are scale-resistant. Copending application Ser. No. 210,137 filed Dec. 20, 1971, now U.S. Pat. No. 3,779,793 a one component polyurethane type coating having pendant polyether chains which are scale-resistant.

Conventional diisocyanate-modified epoxy resins (epoxy resins which are crosslinked with a diisocyanate) are commonly being applied to oil field conduit for corrosion protection, and have been shown to have several advantages over conventional phenolic, polyurethane and epoxy resin coatings. Such diisocyanate-modified epoxy resins exhibit properties such as good temperature, chemical and vapor resistance, and yet, unlike phenolics and many conventional epoxies, have great flexibility, resilience, and impact resistance.

It is, therefore, an object of this invention to combine the above enumerated advantages of diisocyanatemodified epoxy type resins as coatings with the added property of scale-resistance. Briefly this may be accomplished by incorporating into the reaction mixture of polyisocyanate and epoxy, a monohydric polyether.

It is another object of this invention to provide a scale-resistant resin by combining a blocked polyisocyanate, an epoxy resin and a monohydric polyether.

A blocked or masked isocyanate is usually a conventional isocyanate reacted with an excess of a blocking agent, phenol, for instance. Blocked isocyanates normally remain unreactive below about 150°C. When the decomposition temperature of the blocked isocyanate is reached, the blocking agent is driven off and the isocyanate will react with active hydrogen compounds which are present just as a conventional unblocked isocyanate would. Thus, the monhydric polyethers and epoxy compounds may be mixed with the blocked isocyanate and remain stable until heat is applied to cure the resin.

SUMMARY OF THE INVENTION

The invention is a novel, modified epoxy resin made by the reaction of a conventional epoxy resin and a monohydric polyether with a polyisocyanate. The invention is also a method of imparting a scale-resistant coating to a surface by applying thereto a liquid coating of the novel, modified epoxy resin mentioned above and curing the coating to form a solid film.

DESCRIPTION OF THE PREFERRED EMBODIMENTS

I. INGREDIENTS AND CONDITIONS FOR FORMULATING NOVEL, SCALE-RESISTANT POLYURETHANE RESINS

A. Conventional Epoxy Resins

Commercially available epoxy resins can be broadly classed into four groups:
1. aliphatic liquid epoxy resins;
2. modified liquid epoxy resins, comprising aromatic diepoxides plus reactive diluents such as butyl glycidyl ether or phenyl glycidyl ether to lower the viscosity;
3. liquid aromatic epoxy resins;
4. solid aromatic epoxy resins.

While any of these is suitable for use in connection with the instant invention, those epoxy resins prepared by combining epichlorohydrin and p,p'-isopropylidenediphenol ("Bisphenol A") are presently preferred. These resins have the general structural formula:

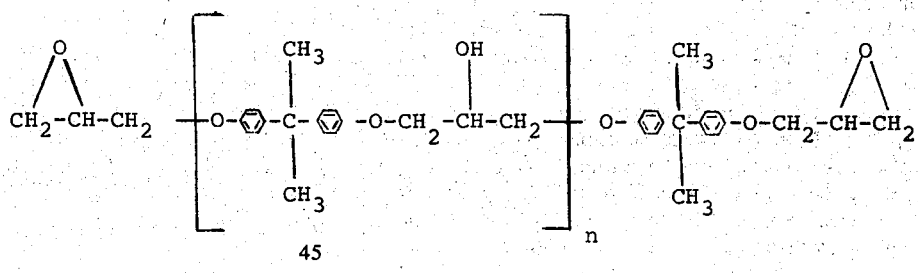

where $n \cong 0$ to 30.

B. Monohydric Polyethers

Polyethers of the type suitable for use in formulating novel, scale-resistant modified epoxy resins of our invention are characterized by polyoxyalkylene chains terminated at one end by an alkyl, aryl, or other appropriate substituent which is nonreactive toward isocyanate functional groups, and terminated at the other end by a hydroxyl group which, upon reaction with the isocyanate groups in the resin reaction mixtue in excess of those required for complete reaction with the active hydrogen of the epoxy component, ultimately provide the requisite pendant polyoxyalkylene chains in the resin mixture. Such monohydric polyethers are of the general structural formula,

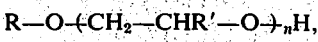

wherein R = alkyl, aryl, or other radical which is nonreactive with isocyanate functional groups, R' = alkyl, and n = about 3 to about 50; examples of such monohydric polyethers are the methoxy, propoxy, and phenoxy polyethylene glycols, polypropylene glycols, polyglycidyl ethers, and the like.

C. Polyisocyanates and Blocked Polyisocyanates

The isocyanates useful in the novel, scale-resistant modified epoxy resins of my invention may be blocked or unblocked. The unblocked polyisocyanates useful in my invention are preferably aromatic polyisocyanates, although aliphatic polyisocyanates are also suitable. For instance, toluene diisocyanate is typical of useful isocyanates and is highly preferred. Also useful are 1,5-naphthalene diisocyanate, m- and p-phenylene diisocyanates, 4,4'-diphenyl-isopropylidine diisocyanate, 4,4'-diphenylsulfone diisocyanate, 4,4'-diphenylmethane diisocyanate, and 4,4',4''-triphenylmethane triisocyanate as well as certain mixtures thereof, for example.

The blocked isocyanates useful in my invention may have the same isocyanate component as those just mentioned. Blocking agents useful for reaction with the isocyanate component to form the blocked isocyanate include hydrogen cyanide, ethyl malonate, acetylacetone, hydroxylamine, aryl mercaptans, monomethylaniline, diphenylamine, phenols, α-pyrrolidone, and caprolactam.

Both blocked and unblocked isocyanates are useful, the only differences occurring in the method of preparing and storing the resins before application. Using unblocked isocyanates, the monohydric polyether and epoxy must be kept separate from the isocyanate until just before application to a surface where the isocyanate reacts with the other two components. This process of reacting to form a solid coating is commonly called curing. The blocked isocyanates, however, may be mixed with the monohydric polyether and epoxy in one component and stored for long periods of time. When the coating is applied it is heated to "unblock" the isocyanate by driving away the blocking agent. The free isocyanate may then react with the epoxy and monohydric polyether to form a solid, scale-resistant coating.

D. Catalysts

The reactions of the epoxy resins and monohydric polyethers with the isocyanates to form the scale-resistant epoxy coatings of my invention may be accelerated and improved by the addition of a catalyst. Suitable catalysts are well known in the art and include such components as stannous octoate, lead octoate, and dibutyltin dilaurate.

E. Optional Additives

To the extent that their incorporation does not substantially affect the scale-resistant properties of the subject novel, scale-resistant epoxy resins, various materials other than the hereinabove described "active" ingredients may optionally be added to the resin formulations to impart certain supplemental special properties for particular in-service usages when deemed desirable. For example, suitable optional additives may be employed to impart such supplemental properties to the subject novel resins as pigments for color identification, "fillers" for enhancement of such physical properties as temperature stability, abrasion resistance, resilience, cohesiveness, and the like, as well as for economic advantages, and reinforcing agents for improved mechanical strength, particularly in the fabrication of scale-resistant articles of manufacture.

The use of such optional additives is well known in the art, and anyone skilled in the art of resin technology could determine which, if any, of such additives could be used advantageously in connection with the novel epoxy resins of this invention.

II. APPLICATION OF SCALE-RESISTANT COATINGS TO SUBSTRATE SURFACES

Application of the novel, scale-resistant epoxy resins can be accomplished by spraying, painting, dipping, or other means. Each coat of the resin is subjected to an intermediate heat cure for about ¾–3 hours at 220° – 280°F., and after the desired number of coats have been applied, the coated article is subjected to a final cure to fully set the resin but without significantly altering the integrity of the pendant polyether chains in the resin.

If a blocked isocyanate is being used, the reaction temperature of the novel epoxy resin will initially be the temperature at which the blocking agent (i.e., phenol) is driven off of the isocyanate being used. When the blocking agent breaks loose from the isocyanate, the active hydrogens of the monohydric polyether and the epoxides of the epoxy begin to react with the isocyanate. Usually this temperature is sufficiently high to adequately accelerate the curing reaction. For example, phenol, blocking toluene diisocyanate, is driven away at 150°C. If desired, the curing temperature may be adjusted after the blocking agent has been driven off.

The preferred method of application involves successively applying and partially curing (1) a "base coat" of suitable priming material, and (2) an outer coat of the novel epoxy resin, followed by (3) a final thermal cure.

From 1 to 4 layers of the base-coat priming material, each about 1 to 3 mils thick, is first applied to the substrate by dipping, painting, spraying or the like, but preferably by spraying; each layer of the base-coat is allowed to dry or partially cure before the following one is applied. Partial curing of the base-coat priming material is accomplished by heating at 220°–280°F. for 0.5 to 1.5 hrs. Then several outer layers, preferably between 1 and 4, made up of the novel epoxy resin, each layer from about 1 to 3 mils thick, are applied and cured for 1–3½ hrs. at 220°–280°F. Finally, the completed coating is crosslinked and consolidated by subjecting it to a post cure of about 1–3½ hrs. at about 320°–400°F. Through trial and error it has been found that a total thickness of 6 to 12 mils of coatings is most effective.

While the base-coating technique is not essential in every instance to the successful application of the scale-resistant coatings of the instant invention, it may greatly improve bonding to the substrate of the novel, scale-resistant epoxy resins, while at the same time acting to forestall possible diffusion or penetration of moisture through the outer epoxy layers and, in the case where the substrate is metallic, resultant corrosion thereof. Nonrestrictive examples of base-coat priming materials satisfactory for the instant purpose include heat-curable resins of the alkyl, epoxy, epoxy-modified phenolic, and phenolic types; resins of the latter type, widely employed for the protection of oil field tubular goods against corrosion, were chosen for use in the examples hereinafter cited simply for reasons of economics and convenience. When this particular type of resin is used as the base-coat priming material in the hereinabove described application and coating procedure, each layer is heat-cured for about ¾ to 3 hrs. at about 220°F. to 280°F.

If desired, intermediate layers made up of a mixture of the primer and the novel, scale-resistant epoxy resin may be used to serve as a transition zone providing interpenetration and to insure strong (chemical) bonding between the base-coat priming layers and the outer layers of novel, scale-resistant epoxy.

III. EVALUATION OF SURFACE SCALE RESISTANCE

Clearly, the preferred method of determining the ability of a surface to resistant scale deposition is by exposure to actual field-operating conditions. However, inasmuch as full-scale tests in the field are both costly and time consuming, the screening procedure described below was employed since it has been found generally by experience over a period of years to correlate well with field results in the evaluation of scale inhibitors.

Rotors 5.5 inches in length, 0.84 inches in diameter, and having a hemispherically rounded tip, are constructed from cold-rolled mild steel stock so that they can be heated by a quartz-encased coil heater which fits inside the rotor. After fabrication, the steel rotors are sand-blasted to roughen the external surface. The steel rotor is then cleaned by the use of solvents, detergents, and abrasive cleaners to provide a bare surface scrupulously free of oil, soil, or scale or of any kind. The resin to be evaluated is then coated on the cleaned rotors by the procedures hereinabove described in II, "Application of Scale-Resistant Coatings to Substrate Surfaces."

Except for the rotor design, the evaluation procedure used is that described in the journal "Corrosion", Vol. 17, No. 5, pp. 232t–236t (May 1961), and by U.S. Pat. No. 3,488,289. The test functions by allowing a deposit of gypsum (calcium sulfate scale) from a supersaturated solution thereof to slowly accrete on the surface of a heated, rotating cylinder to the extent that the surface of the cylinder is by nature scale prone. After the test, the rotor is carefully rinsed in acetone and allowed to dry under a heat lamp. The adhering scale, if any, is carefully scraped from the rotor and weighed. The weight of scale deposited on an uncoated metal rotor, used as a control, is compared to that deposited on rotors coated with conventional resins and to that deposited on rotors coated with the novel epoxy resins of my invention.

The following examples are illustrative of the production of typical scale-resistant epoxy resins in accordance with the present invention. It will be understood that similar reactants can be utilized, proportions modified, temperatures, times, concentrations, and other conditions altered, all within the guiding principles taught herein, without departing from the essential teachings herein disclosed.

EXAMPLES

EXAMPLE I. PREPARATION OF DIISOCYANATE-CROSSLINKED POXY RESINS

A. Formulation I

A charge of 15.1 g. of powdered phenol-blocked toluene diisocyanate was dissolved in 30.0 ml. of a 1:1 toluene/ethyl acetate solvent mixture by heating with stirring at 70°C. When dissolution was complete, 20.0 g. of bisphenol A/epichlorohydrin type epoxy resin along with 2.0 g. of monohydric polyether of the general formula $CH_3O-(CH_2-CH_2O)_{16}H$ were added to the solution and stirred until well mixed. After cooling the mixture to room temperature, 0.15 g. of dibutyl tin dilaurate was added and mixed in.

B. Formulation II

A charge of 22.0 g. of powdered phenol-blocked toluene diisocyanate was dissolved in 40.0 ml. of a 1:1 toluene/ethyl acetate solvent mixture by heating with stirring at 70°C. Then, 20.0 g. of a bisphenol A/epichlorohydrin type epoxy resin and 5.0 g. of monohydric polyether of the general formula $CH_3O-(CH_2-CH_2O)_{16}H$ were added to the solution and mixed well for about an hour. After cooling to room temperature, 0.3 g. of dibutyl tin dilaurate was stirred in.

EXAMPLE II. PREPARATION OF A CONVENTIONAL DIISOCYANATE-CROSSLINKED EPOXY RESIN

A charge of 7.0 g. of powdered phenol blocked toluene diisocyanate was dissolved in 30.0 ml. of a 1:1 toluene/ethyl acetate solvent mixture by heating with stirring at 70°C. Then, 20.0 g. of a bisphenol A/epichlorohydrin type epoxy resin was added to the solution and this mixture stirred for about an hour. After cooling to room temperature, 0.1 g. of dibutyl tin dilaurate was stirred in.

EXAMPLE III. COATING AND CURING PROCEDURE

All items to be coated were sandblasted to "white" metal and any loose material remaining was removed using compressed air. Then 4 one mil coats of Union Carbide's Bakelite BKS 2600 phenolic resin, which had been filled on an equal weight basis with an 80/20 mixture of No. 1 Barytes and red iron oxide pigment, were applied with an air brush. Air drying was used after the first and third coats and oven curing at 250°F. for 0.5 hour after the second and fourth coats. Then two light coats of the desired diisocyanate-crosslinked epoxy resin were applied with air drying between coats. This coating was then cured for 2 hours at 250°F. followed by a post cure of 1 hour at 350°F.

EXAMPLE IV. LABORATORY SCALE-RESISTANCE EVALUATION

The laboratory technique for evaluating plastic coatings for resistance to adherent mineral scale formation has been presented prevously. Results of these tests are tabulated below.

Scale Test Results

| Coating | Gypsum Scale Deposited, g. |
|---|---|
| Conventional Diisocyanate-Crosslinked Epoxy Resin | 0.7793 |
| Formulation I | 0.00 |
| Formulation II | 0.00 |

I claim:

1. A novel scale-resistant modified epoxy resin made by the curing reaction of an epoxy resin prepared by combinind epichlorohydrin and p,p'-isopropylidene diphenol having the structural formula:

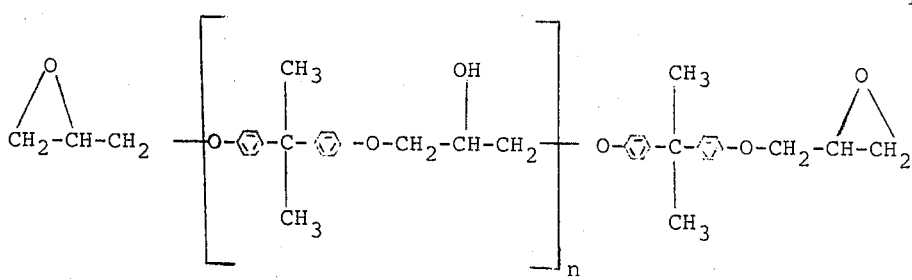

where $n = 0$ to $30$ and a monohydric polyether which is represented by the formula R—O—(CH$_2$—CHR'—O—)$_n$H wherein R= alkyl, aryl, or other radical which is non-reactive with isocyanate functional groups, R'=alkyl and n=about 3 to about 50'', with a blocked polyisocyanate selected from the group consisting of toluene disocyanate 1,5-napththalene diisocyanate, m-and p-phenylene diisocyanates, 4,4' diphenyl-isopropylidene diisocyanate, 4,4'-diphenysulfone diisocyanate, 4,4' diphenylmethane diisocyanate, and 4,4',4''triphenylmethane triisocyanate, the isocyanate being blocked with agents selected from the group consisting of hydrogen cyanide, ethyl malonate, acetylacetone, hydroxylamine, aryl mercaptans, monomethylaniline, diphenylamine, phenols, σ-pyrrolidone and caprolactam.

2. A modified epoxy resin as in claim 1 wherein the resin is in the form of a coating on a substrate.

3. A resin as in claim 1 wherein the blocked isocyanate is toluene diisocyanate reacted with phenol.

4. A modified epoxy resin as in claim 1 wherein a catalyst is added to accelerate the reaction between the isocyanate groups and the monohydric polyether and epoxide groups of the epoxy resin.

* * * * *